(12) United States Patent
Laurent et al.

(10) Patent No.: US 9,599,752 B2
(45) Date of Patent: Mar. 21, 2017

(54) SUBSTRATE PROVIDED WITH A MULTILAYER COATING HAVING THERMAL PROPERTIES, IN PARTICULAR FOR PRODUCTION OF A HEATED GLAZING UNIT

(75) Inventors: Stephane Laurent, Clichy (FR); Robert Drese, Aachen (DE); Ruth Verena Skantze, legal representative, Husby-Rekarne (SE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 508 days.

(21) Appl. No.: 13/978,042

(22) PCT Filed: Jan. 6, 2012

(86) PCT No.: PCT/FR2012/050041
§ 371 (c)(1),
(2), (4) Date: Jan. 6, 2014

(87) PCT Pub. No.: WO2012/093238
PCT Pub. Date: Jul. 12, 2012

(65) Prior Publication Data
US 2014/0198389 A1    Jul. 17, 2014

(30) Foreign Application Priority Data
Jan. 6, 2011   (FR) ..................... 11 50087

(51) Int. Cl.
*G02B 1/11* (2015.01)
*C03C 17/36* (2006.01)

(52) U.S. Cl.
CPC ............... *G02B 1/11* (2013.01); *C03C 17/36* (2013.01); *C03C 17/3618* (2013.01);
(Continued)

(58) Field of Classification Search
CPC .. G02B 1/11; G02B 1/115; G02B 5/28; G02B 1/105; G02B 5/287; G02B 5/288;
(Continued)

(56) References Cited

U.S. PATENT DOCUMENTS

| 7,166,360 B2 | 1/2007 | Coustet et al. |
| 7,452,603 B2 | 11/2008 | Fleury et al. |

(Continued)

FOREIGN PATENT DOCUMENTS

EP    2 030 954    3/2009

OTHER PUBLICATIONS

International Search Report Issued Apr. 17, 2012 in PCT/FR12/50041 Filed Jan. 6, 2012.

*Primary Examiner* — Pascal M Bui-Pho
*Assistant Examiner* — Alberto Betancourt
(74) *Attorney, Agent, or Firm* — Oblon, McClelland, Maier & Neustadt, L.L.P.

(57) ABSTRACT

The invention relates to a substrate (10), especially a transparent glass substrate, equipped with a thin-film multilayer comprising, in alternation, "n" metallic functional films (40, 80, 120), in particular functional films based on silver or a metal alloy containing silver, and "(n+1)" antireflection coatings (20, 60, 100, 140), where n is an integer≥3, each antireflection coating comprising at least one antireflection film, so that each functional film (40, 80, 120) is located between two antireflection coatings (20, 60, 100, 140), characterized in that said multilayer comprises at least two high-refractive-index antireflection films (25, 145), each having a refractive index≥2.15 such that the antireflection coating (20) located under the first, starting from the substrate, functional film (40) and the antireflection coating located on the last, starting from the substrate, functional film each comprise at least one high-refractive-index anti-
(Continued)

reflection film (25, 145) and each antireflection coating (60, 100) located between two functional films does not comprise a high-refractive-index film.

25 Claims, 2 Drawing Sheets

(52) U.S. Cl.
CPC ...... *C03C 17/3626* (2013.01); *C03C 17/3639* (2013.01); *C03C 17/3644* (2013.01); *C03C 17/3652* (2013.01); *C03C 17/366* (2013.01); *C03C 17/3681* (2013.01); *C03C 2217/73* (2013.01); *C03C 2217/734* (2013.01)

(58) Field of Classification Search
CPC ............ G02B 1/111; G02B 1/113; G02B 1/10; G02B 1/116; C03C 2217/73; C03C 2217/734; C03C 17/3639; C03C 17/3644; C03C 2217/732

USPC ....... 359/577, 580, 581, 585, 586, 587, 588, 359/589, 590
See application file for complete search history.

(56) References Cited

U.S. PATENT DOCUMENTS

| | | | |
|---|---|---|---|
| 7,972,713 B2 | 7/2011 | Fleury et al. | |
| 8,440,329 B2 | 5/2013 | Fleury et al. | |
| 2003/0170466 A1 | 9/2003 | Stachowiak | |
| 2003/0180547 A1* | 9/2003 | Buhay et al. | 428/434 |
| 2005/0175845 A1 | 8/2005 | Stachowiak | |
| 2006/0046073 A1 | 3/2006 | Neuman et al. | |
| 2008/0018979 A1* | 1/2008 | Mahe et al. | 359/267 |
| 2008/0239488 A1* | 10/2008 | Asakura et al. | 359/485 |
| 2009/0015909 A1 | 1/2009 | Fleury et al. | |
| 2009/0047466 A1 | 2/2009 | German et al. | |
| 2010/0183857 A1* | 7/2010 | Nouvelot et al. | 428/213 |
| 2011/0268941 A1 | 11/2011 | Fischer et al. | |
| 2011/0300319 A1 | 12/2011 | Reymond et al. | |
| 2011/0305853 A1 | 12/2011 | Reymond et al. | |
| 2012/0028009 A1 | 2/2012 | Gerardin et al. | |
| 2012/0177900 A1 | 7/2012 | Laurent et al. | |

* cited by examiner

SUBSTRATE PROVIDED WITH A MULTILAYER COATING HAVING THERMAL PROPERTIES, IN PARTICULAR FOR PRODUCTION OF A HEATED GLAZING UNIT

CROSS-REFERENCE TO RELATED APPLICATIONS

This application is the U.S. national-stage of PCT/FR12/050041, filed Jan. 6, 2012, which claims priority to France 11 50087, filed Jan. 6, 2011 both of which are incorporated by reference in their entireties.

BACKGROUND OF THE INVENTION

Field of the Invention

The invention relates to a transparent substrate, especially made of a rigid mineral material such as glass, said substrate being coated with a thin-film multilayer comprising a plurality of functional films that can act on solar radiation and/or infrared radiation of long wavelength.

Description of Related Art

Multilayers comprising a plurality of functional films are known from the prior art, for example international patent application WO 2005/051858.

BRIEF SUMMARY OF THE INVENTION

One nonlimiting embodiment of the invention is a substrate (10), especially a transparent glass substrate, equipped with a thin-film multilayer comprising, in alternation, "n" metallic functional films (40, 80, 120), in particular functional films based on silver or a metal alloy containing silver, and "(n+1)" antireflection coatings (20, 60, 100, 140), where n is an integer≥3, each antireflection coating comprising at least one antireflection film, so that each functional film (40, 80, 120) is located between two antireflection coatings (20, 60, 100, 140), characterized in that said multilayer comprises at least two high-refractive-index antireflection films (25, 145), each having a refractive index≥2.15, such that the antireflection coating (20) located under the first, starting from the substrate, functional film (40) and the antireflection coating located on the last, starting from the substrate, functional film each comprise at least one high-refractive-index antireflection film (25, 145) and each antireflection coating (60, 100) located between two functional films does not comprise a high-refractive-index film.

The prior art also comprises European patent application EP 2 030954. In that document one of at least two films called "dielectric absorber" films, which are both moreover "neutral" absorbers, is located under the first metallic functional film, starting from the substrate, of a multilayer comprising at least two metallic functional films, and the other "dielectric absorber" film is located on the last metallic functional film, starting from the substrate, of said multilayer.

DETAILED DESCRIPTION OF THE INVENTION

Figure 1:
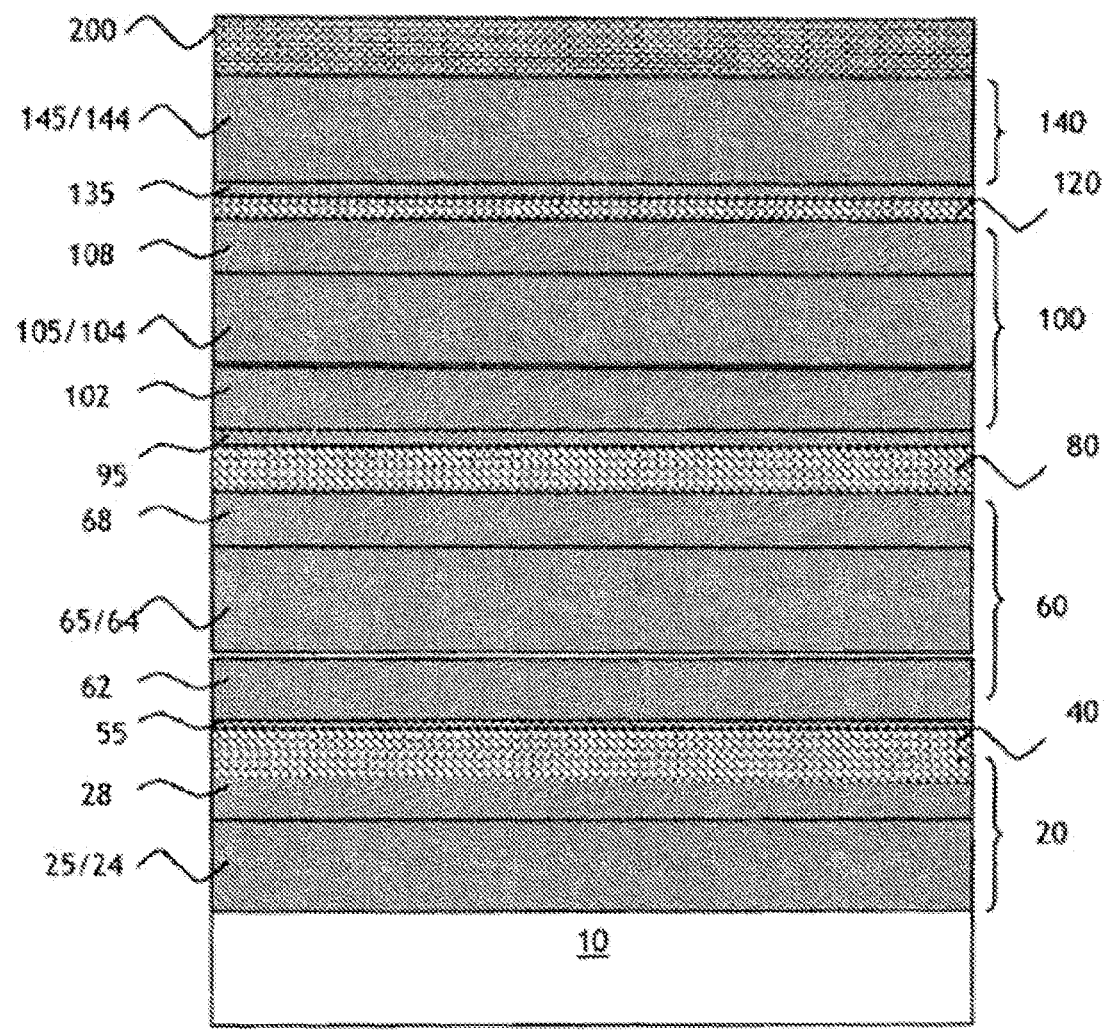
FIG. 1 describes a multilayer comprising three functional films according to the invention, each functional film not being provided with an underblocker layer but being provided with an overblocker layer and the multilayer furthermore being provided with an optional protective coating.

The invention more particularly relates to a substrate, especially a transparent glass substrate, equipped with a thin-film multilayer comprising, in alternation, "n" metallic functional films, especially functional films based on silver or a metal alloy containing silver, and "(n+1)" antireflection coatings, where n is an integer≥3, so that each functional film is located between two antireflection coatings. Each coating comprises at least one antireflection film, and each coating preferably consists of a plurality of films at least one film, or even each film, of which is an antireflection film.

The invention relates more particularly to the use of such substrates for manufacturing thermal insulation and/or solar protection glazing units. These glazing units may be intended both for equipping buildings and for equipping vehicles, especially with the purpose of reducing air-conditioning load and/or preventing overheating (called "solar control" glazing) and/or reducing the amount of energy dissipated to the outside (called "low-E" or "low-emissivity" glazing) brought about by the ever increasing use of glazed surfaces in buildings and in vehicle passenger compartments.

These substrates may in particular be incorporated in electronic devices and the multilayer may then serve as an electrode in order to conduct current (lighting device, display device, photovoltaic panel, electrochromic glazing unit, etc.) or they may be incorporated in glazing units having a particular purpose such as, for example, heated glazing units, and in particular heated vehicle windshields.

Within the context of the present invention, a multilayer comprising a plurality of functional films is understood to mean a multilayer comprising at least three functional films.

Film multilayers comprising a plurality of functional films are known.

In this type of multilayer, each functional film is located between two antireflection coatings each in general comprising a plurality of antireflection films that are each made of a nitride and especially of silicon or aluminum nitride and/or of an oxide. From the optical point of view, the aim of these coatings that flank the functional film is to make this functional film "antireflective". These antireflection films are sometimes called "dielectric films", to contrast with the metallic (and therefore conductive) nature of the functional films.

However a very thin blocker layer is sometimes interposed between one or each antireflection coating and an adjacent functional film: a blocker layer located under the functional film, in the substrate direction, and/or a blocker layer located on the functional film, opposite from the substrate, protect this film from damage liable to occur during deposition of the subsequent antireflection coating or during any high-temperature heat treatments carried out such as bending and/or tempering heat treatments.

These blocker layers are not part of the antireflection coatings because in general they are not taken into consideration when defining the optical properties of the multilayer.

Multilayers comprising a plurality of functional films are known from the prior art, for example international patent application WO 2005/051858.

In the multilayers comprising three or four functional films presented in that document, the antireflection films used are customarily considered to be what are called "medium"-refractive-index films, i.e. having a refractive index that is neither high nor low.

Specifically, in thin-film multilayers it is customary for "low"-refractive-index films to have a refractive index of 1.60 or less, for "medium"-refractive-index films to have a refractive index of between >1.60 and <2.15 and for "high"-refractive-index films to have a refractive index of 2.15 or more.

It will be recalled that n denotes the real refractive index of the material at a given wavelength and k represents the imaginary part of the refractive index at a given wavelength.

Throughout the present document, the refractive index of the films is the refractive index measured at a wavelength of 550 nm, as is customary; for the sake of simplicity the refractive indices are given to two decimal places without rounding. The extinction coefficients k are also given for a wavelength of 550 nm.

It appears that the configuration of the examples in application WO 2005/051858 is not entirely satisfactory.

For a number of applications it is desired for the light transmission of the multilayer (and therefore of the glazing unit incorporating the multilayer) to be higher while the sheet resistance of the multilayer is kept low and/or for the light reflection of the multilayer (and therefore of the glazing unit incorporating the multilayer) to be lower while the sheet resistance of the multilayer is kept low and/or for the color in reflection to be less pronounced, with values measured for example in the Lab system that are closer to zero, white the sheet resistance of the multilayer is kept low. A low sheet resistance is here a resistance of 1Ω/□ or less.

The prior art also comprises European patent application EP 2 030954.

In that document one of at least two films called "dielectric absorber" films, which are both moreover "neutral" absorbers, is located under the first metallic functional film, starting from the substrate, of a multilayer comprising at least two metallic functional films, and the other "dielectric absorber" film is located on the last metallic functional film, starting from the substrate, of said multi layer.

The dielectric absorbent films of that document have a non-negligible absorption coefficient k of at least 0.1.

The dielectric absorbent films of that document are thus qualified as being "dielectric" so as to allow them to be distinguished from the metallic functional films, which also absorb to a certain degree. By way of information, the coefficient k of silver, from which the metallic functional films are made, is about 3.34 at 550 nm.

Furthermore, "neutral" absorption in fact corresponds to balanced absorption in the visible wavelength range, with the ratio of the coefficient k at short wavelengths (380<λ<450 nm) in the visible to the coefficient k at long wavelengths (650<λ<760 nm) in the visible being balanced, i.e. about 1, and more precisely lying between 0.52 and 1.9.

The aim of the solution of that document is to increase the capacity of the multilayer to absorb solar radiation (in particular in the infrared), while being of a color qualified in that document as "pleasant", by using neutral absorbent films and by arranging said films in a particular way in the multilayer.

The necessary consequence of this solution is that the multilayer cannot have a high light transmission in the visible because the dielectric absorbent films absorb not only in the infrared wavelength range, but also, in a non-negligible way, in the visible wavelength range.

FIGS. 7 and 8 of European patent application EP 2 030 954 show, respectively, the extinction coefficient k and the refractive index n of two silicon- and titanium-nitride compounds, one comprising 45% TiN and 55% silicon nitride and the other 71% TiN and 29% silicon nitride.

The coefficient k of TiN at 550 nm is about 1.88 and the coefficient k of $Si_3N_4$ at 550 nm is about 0.0135. Logically, FIG. 7 shows that the k values for the two compounds are between these two values. Moreover, FIG. 7 shows that the k values for the two compounds are relatively high: inserting $Si_3N_4$ at 29% and 55% into TiN therefore has little effect on the coefficient k of TiN.

The refractive index n of TiN at 550 nm is about 0.97 and the refractive index of $Si_3N_4$ at 550 nm is about 2.02. Logically, it would be expected for the refractive indices of compounds consisting of a mixture of these two materials to lie between these two values; however, completely unexpectedly, FIG. 8 indicates that the refractive index of the compounds at 550 nm is higher than that of $Si_3N_4$, namely between 2.4 and 2.5, which is therefore inconsistent. Furthermore, with regard to the weak "dilution" of the coefficient k of TiN by $Si_3N_4$, shown in FIG. 7, it would be expected for FIG. 8 to show that the refractive indices of the two compounds to be tow and hardly affected by the insertion of $Si_3N_4$ at all, making FIG. 8 even more inconsistent.

In fact, a compound consisting of a mixture of silicon nitride and titanium nitride necessarily has a refractive index tying between the refractive index of $Si_3N_4$ and that of TiN.

The aim of the invention is to provide a multilayer which has a very low sheet resistance in order, in particular, for the glazing unit incorporating this multilayer to be able to exhibit high energy reflection and/or very low emissivity and/or to be able to be heated by applying a current between two busbars electrically connected to the multilayer, and a high light transmission and a relatively neutral color, in particular when laminated, and for these properties to be preferably obtained after one (or more) high-temperature bending and/or tempering and/or annealing heat treatment(s), or indeed for these properties to be obtained before one or more high-temperature bending and/or tempering and/or annealing heat treatments, and for these properties to be maintained within a limited range whether or not the multilayer undergoes one (or more) of such heat treatment(s). The light transmission and light reflection referred to in the present document are, of course, the light transmission and light reflection in the visible wavelength range.

One subject of the invention, in its widest sense, is thus a substrate, especially a transparent glass substrate, as claimed in Embodiment 1.

Embodiment 1

A substrate (10), especially a transparent glass substrate, equipped with a thin-film multilayer comprising, in alternation, "n" metallic functional films (40, 80, 120), in particular functional films based on silver or a metal alloy containing silver, and "(n+1)" antireflection coatings (20, 60, 100, 140), where n is an integer≥3, each antireflection coating comprising at least one antireflection film, so that each functional film (40, 80, 120) is located between two antireflection coatings (20, 60, 100, 140), characterized in that said multilayer comprises at least two high-refractive-index antireflection films (25, 145), each having a refractive index≥2.15, such that the antireflection coating (20) located under the first, starting from the substrate, functional film (40) and the antireflection coating located on the last, starting from the substrate, functional film each comprise at least one high-refractive-index antireflection film (25, 145) and each antireflection coating (60, 100) located between two functional films does not comprise a high-refractive-index film.

The dependent claims define advantageous embodiments of this substrate.

The substrate according to the invention is thus equipped with a thin-film multilayer comprising, in alternation, "n" metallic functional films, in particular functional films based on silver or a metal alloy containing silver, and "(n+1)" antireflection coatings, where n is an integer≥3, each antireflection coating comprising at least one antireflection film, so that each functional film is Located between two antireflection coatings. The present invention is in particular suitable for multilayers comprising n=3 or n=4 functional films.

This substrate is noteworthy in that said multilayer comprises at least two high-refractive-index antireflection films, each having a refractive index≥2.15, such that the antireflection coating located under the first, starting from the substrate, functional film and the antireflection coating located on the last, starting from the substrate, functional film each comprise at least one high-refractive-index antireflection film and each antireflection coating located between two functional films does not comprise a high-refractive-index film (i.e. each antireflection coating located between two functional films comprises no high-refractive-index antireflection film having a refractive index≥2.15).

By its very nature, in the technical field of the invention, an antireflection film cannot be an absorbent film because customarily the term "antireflection" denotes a nonabsorbent film.

High-refractive-index films according to the invention can in this respect be qualified as transparent films since they are non-absorbent; they each have a negligible absorption coefficient k below 0.1 and even below 0.01.

A fortiori, the high-refractive-index films according to the invention do not exhibit "neutral" absorption; they do not exhibit balanced absorption in the visible wavelength range, with the ratio of the coefficient k at short wavelengths (380<λ<450 nm) in the visible to the coefficient k at long wavelengths (650<λ<760 nm) in the visible being balanced, i.e. about 1, and more precisely lying between 0.52 and 1.9, because this ratio only has meaning for non-negligible k values.

These high-refractive-index films according to the invention could also be called "high-refractive-index dielectric antireflection films", to contrast with the metallic (and therefore conductive) nature of the functional films.

The antireflection coating located under the first, starting from the substrate, functional film preferably consists, in this order, starting from the substrate, of: one or more high-refractive-index antireflection films and then a medium-refractive-index wetting antireflection film having a refractive index of between 1.60 and 2.15, excluding these values, and based on a crystalline oxide, especially based on zinc oxide, optionally doped with at least one other element such as aluminum.

In a particular variant, the antireflection coating located on the last, starting from the substrate, functional film consists uniquely of one or more high-refractive-index antireflection films; it therefore does not comprise a medium- or low-refractive-index film.

Preferably, at least one, even each, high-refractive-index antireflection film is based on silicon zirconium nitride. Another possible material for the high-refractive-index antireflection film may be chosen from: MnO (refractive index of 2.16 at 550 nm), $WO_3$ (refractive index of 2.15 at 550 nm), $Nb_2O_5$ (refractive index of 2.3 at 550 nm), $Bi_2O_3$ (refractive index of 2.6 at 550 nm) and $Zr_3N_4$ (refractive index of 2.55 at 550 nm).

It is known that thin high-refractive-index films have at most a refractive index of 3.1 at 550 nm. Each high-refractive-index antireflection film according to the invention preferably has a refractive index of 2.6 or less or even 2.3 or less.

When a high-refractive-index film based on silicon zirconium nitride is chosen, the proportion of silicon relative to zirconium is preferably between 40 and 80% Si for 25 to 45% Zr, with, of course, a total, by weight, in the target of 100%, so as to obtain the desired high refractive index.

When the proportion of silicon is high (above 40% by weight in the target), it is possible to use another element, such as for example Al, to increase the conductivity of the target. In this case, to obtain the desired refractive index, it is preferable for the elements Si, Zr and Al to be present in a proportion by weight in the target in the following ranges, respectively:

for Si: between 45% and 75%, including these values;
for Zr: between 20% and 50%, including these values; and
for Al: between 1% and 10%, including these values;
with, of course, a total, by weight, in the target, of 100%.

Moreover, when the one or more high-refractive-index films of the last antireflection coating are one or more nitride films, the antireflection coating located on the last, starting from the substrate, functional film preferably consists only of nitride films, so as to make manufacturing the multilayer easier.

Moreover, at least one, even each, high-refractive-index antireflection film is preferably not based on titanium oxide, $TiO_2$ or $TiO_y$.

In a variant, the thickness $e_x$ of each functional film of the multilayer (i.e. at least functional films in row 2 and row 3, starting from the substrate) is smaller than the thickness of the preceding functional film, in the direction of the substrate, and is such that: $e_x = \alpha e_{x-1}$, where: x is the row, starting from the substrate, of the functional film; x−1 is the row, in the direction of the substrate, of the preceding functional film; and a is a number such that $0.5 \leq \alpha < 1$, and preferably $0.55 \leq \alpha \leq 0.95$, or $0.6 \leq \alpha \leq 0.95$.

In another variant, the thickness $e_x$ of each functional film of the multilayer (i.e. at least functional films in row 2 and row 3, starting from the substrate) is identical to the thickness of the preceding functional film, in the direction of the substrate, and is such that: $e_x = \alpha e_{x-1}$, where: x is the row, starting from the substrate, of the functional film; x−1 is the row, in the direction of the substrate, of the preceding functional film; and α is a number such that $0.85 \leq \alpha < 1.15$, and preferably $0.90 \leq \alpha \leq 1.1$, or $0.95 \leq \alpha \leq 1.05$.

The term "row" is, in the present invention, understood to mean the integer number, starting from the substrate, of each functional film: the functional film closest the substrate is the functional film of row 1, the following film, on moving further away from the substrate, is that of row 2, etc.

The thickness of the first, starting from the substrate, metallic functional film (i.e. that of row 1) is such that $10 \leq e_1 \leq 18$ in nm and preferably $11 \leq e_1 \leq 15$ in nm.

Thus, when $0.55 \leq \alpha \leq 0.95$, the thickness of the first, starting from the substrate, metallic functional film is such that: $10 \leq e_1 \leq 18$ in nm and preferably $11 \leq e_1 \leq 15$ in nm and when $0.6 \leq \alpha \leq 0.95$, the thickness of the first, starting from the substrate, metallic functional film is such that: $10 \leq e_1 \leq 18$ in nm and preferably $11 \leq e_1 \leq 15$ in nm.

It is moreover possible for $0.6 \leq \alpha \leq 0.9$ and for the thickness of the first, starting from the substrate, metallic functional film to be such that: $10 \leq e_1 \leq 18$ in nm and preferably $11 \leq e_1 \leq 15$ in nm, or for $0.6 \leq \alpha \leq 0.85$ and for the thickness of the first, starting from the substrate, metallic functional film to be such that: $10 \leq e_1 \leq 18$ in nm and preferably $11 \leq e_1 \leq 15$ in nm.

Moreover, because an essential aim of the invention is to provide a multilayer having a low sheet resistance, the total thickness of the metallic functional films is, especially when $11 \leq e_1 \leq 15$ in nm, preferably greater than 30 nm and especially ties between 30 and 60 nm, including these values, or this total thickness ties between 35 and 50 nm for a thin-film multilayer comprising three functional films, or this total thickness ties between 40 and 60 nm for a thin-film multilayer comprising four functional films.

Preferably, the value of a is different (by at least 0.02, even by at least 0.05) for all the functional films of row 2 or more of the multilayer to which the formula $e_x = \alpha e_{x-1}$ is applied.

It is important to note here that the decrease in the distribution of the thicknesses is not a decrease in the distribution of all the films of the multilayer (taking into account the antireflection films), but only a decrease in the distribution of the thicknesses of the functional films.

Inside the multilayer comprising functional films of decreasing thickness, starting from the substrate, all the functional films have different thicknesses; however, the distribution in the thickness of the functional films inside the multilayer then allows, in a completely unexpected way, a better sheet resistance to be obtained compared to that achieved for the configuration comprising functional films of constant thickness or comprising functional films of increasing thickness, starting from the substrate.

Unless otherwise specified, the thicknesses given in the present document are physical, or real, thicknesses (and not optical thicknesses).

Moreover, when mention is made of the vertical position of a film (e.g. on/under), the bearing substrate is always taken to be positioned horizontally, at the bottom, with the multilayer on it. When it is specified that a film is deposited directly on another, this means that there is(are) no other film(s) intermediate between these two films. The row of the functional films is here always defined starting from the substrate bearing the multilayer (substrate on the face of which the multilayer is deposited).

The thickness of each functional film preferably lies between 8 and 20 nm, including these values, even between 10 and 18 nm, including these values, and more preferably between 11 and 15 nm, including these values.

The total thickness of the metallic functional films is preferably greater than 30 nm and especially lies between 30 and 60 nm, including these values, or this total thickness lies between 35 and 50 nm for a thin-film multilayer comprising three functional films, or this total thickness lies between 40 and 60 nm for a thin-film multilayer comprising four functional films.

The multilayer according to the invention is a low-sheet-resistance multilayer such that its sheet resistance R in $\Omega/\square$ is preferably $1\Omega/\square$ or less after an optional heat treatment of the bending, tempering or annealing type, or even $1\Omega$ or less before the heat treatment, because such a treatment in general reduces the sheet resistance.

In a specific variant of the invention, each of said antireflection coatings located between two functional films and that do not comprise a high-refractive-index antireflection film comprise at least one antireflection film based silicon nitride, optionally doped with at least one other element, such as aluminum.

In a particular variant of the invention, the last film of each antireflection coating subjacent a functional film is a wetting antireflection film based on a crystalline oxide, especially zinc oxide, optionally doped with at least one other element, such as aluminum.

The present invention moreover relates to a glazing unit incorporating at least one substrate according to the invention, optionally associated with at least one other substrate and especially a multiple glazing unit such as a double or triple glazing unit or a laminated glazing unit and in particular a laminated glazing unit comprising means of electrically connecting the thin-film multilayer in order to allow a heated laminated glazing unit to be produced, said substrate bearing the multilayer possibly being bent and/or tempered.

Each substrate of the glazing may be clear or tinted. One of the substrates at least may especially be made of bulk-tinted glass. The choice of the type of tint depends on the light transmission level and/or on the colorimetric aspect required for the glazing unit once manufactured.

The glazing unit according to the invention may have a laminated structure, especially associating at least two rigid glass substrates with at least one thermoplastic polymer sheet, so as to provide a glass/thin-film multilayer/sheet(s)/glass structure. The polymer may especially be based on polyvinyl butyral (PVB), ethylene vinyl acetate (EVA), polyethylene terephthalate (PET) or polyvinyl chloride (PVC).

The glazing unit may then have a glass/thin-film multilayer/polymer sheet(s)/glass structure.

The glazing units according to the invention are able to withstand a heat treatment without damage being done to the thin-film multilayer. They are therefore optionally bent and/or tempered.

The glazing unit may be bent and/or tempered while consisting of a single substrate, provided with the multilayer. The glazing unit is then termed "monolithic". In the case where the glazing units are bent, especially with a view to producing automotive glazing, the thin-film multilayer is preferably located on an at least partially nonplanar face.

The glazing unit may also be a multiple glazing unit, especially a double glazing unit, at least the substrate bearing the multilayer possibly being bent and/or tempered. In a multiple-glazing configuration the multilayer is preferably arranged so as to be next to the intermediate gas-filled cavity. In a laminated structure, the substrate bearing the multilayer may make contact with the polymer sheet.

The glazing unit may also be a triple glazing unit consisting of three glass panes separated, two by two, by a gas-filled cavity. In a triple glazing structure, the substrate bearing the multilayer may be on face 2 and/or face 5, if incident sunlight is taken to pass through the faces in increasing numerical order.

When the glazing unit is a monolithic, multiple (double or triple) or laminated glazing unit, at least the substrate bearing the multilayer may be made of bent or tempered glass, the substrate possibly being bent or tempered before or after the multilayer has been deposited.

The invention also relates to the use of the substrate according to the invention for producing a glazing unit having high energy reflection and/or a glazing unit having very low emissivity and/or a heated glazing unit with a transparent coating heated by Joule heating.

The invention also relates to the use of the substrate according to the invention to produce a transparent electrode for an electrochromic glazing unit or for a lighting device or for a display device or for a photovoltaic panel.

The substrate according to the invention may, in particular, be used to produce a substrate having high energy reflection and/or a substrate having very low emissivity and/or a heated transparent coating for a heated glazing unit.

The substrate according to the invention may, in particular, be used to produce a transparent electrode for an electrochromic glazing unit (this glazing unit being a monolithic, multiple (double or triple) or laminated glazing unit) or for a lighting device, or for a display screen or for a photovoltaic panel. (The term "transparent" is here understood to mean "non-opaque").

The multilayer according to the invention allows a very low sheet resistance, a high light transmission (>70% and even >72% when laminated), a low light reflection (<14% when laminated) and a color in reflection that is not too pronounced (with a* and b* coordinates in the Lab system that are near zero, or in any case lower than +2 for a*) and which furthermore does not vary greatly as a function of the viewing angle, to be obtained.

Specifically, it seems that providing at least one high-refractive-index antireflection film in the first antireflection coating under the first functional film and at least one high-refractive-index antireflection film in the last antireflection coating on the last functional film, without providing a high-refractive-index antireflection film in the intermediate antireflection coatings, each located between two functional films, makes it possible to increase the light transmission and to obtain a color in reflection that is very close to zero and that varies very little as a function of the viewing angle, without overly complicating the deposition of the multilayer, or greatly increasing its cost (this is because, in general, a high-refractive-index antireflection film is more difficult to deposit than a medium-refractive-index antireflection film and costs more than a medium-refractive-index antireflection film).

The antireflection coatings of the multilayer according to the invention comprise no absorbent films.

Furthermore, employing a decreasing, starting from the substrate, distribution of functional-film thicknesses allows a very low sheet resistance to be obtained, for the multilayer, while the color in reflection as a function of the angle remains acceptable, though admittedly not as good as that obtained with an increasing distribution of thicknesses, and while still obtaining an acceptable variation in the color in reflection as a function of the angle.

However, it is then important for the difference in thickness from one functional film to another, in the substrate direction, or in the direction away from the substrate, not to be too great. This is the reason why $\alpha \geq 0.5$, and preferably $\alpha \geq 0.55$, even $\alpha \geq 0.6$.

Figure 2:
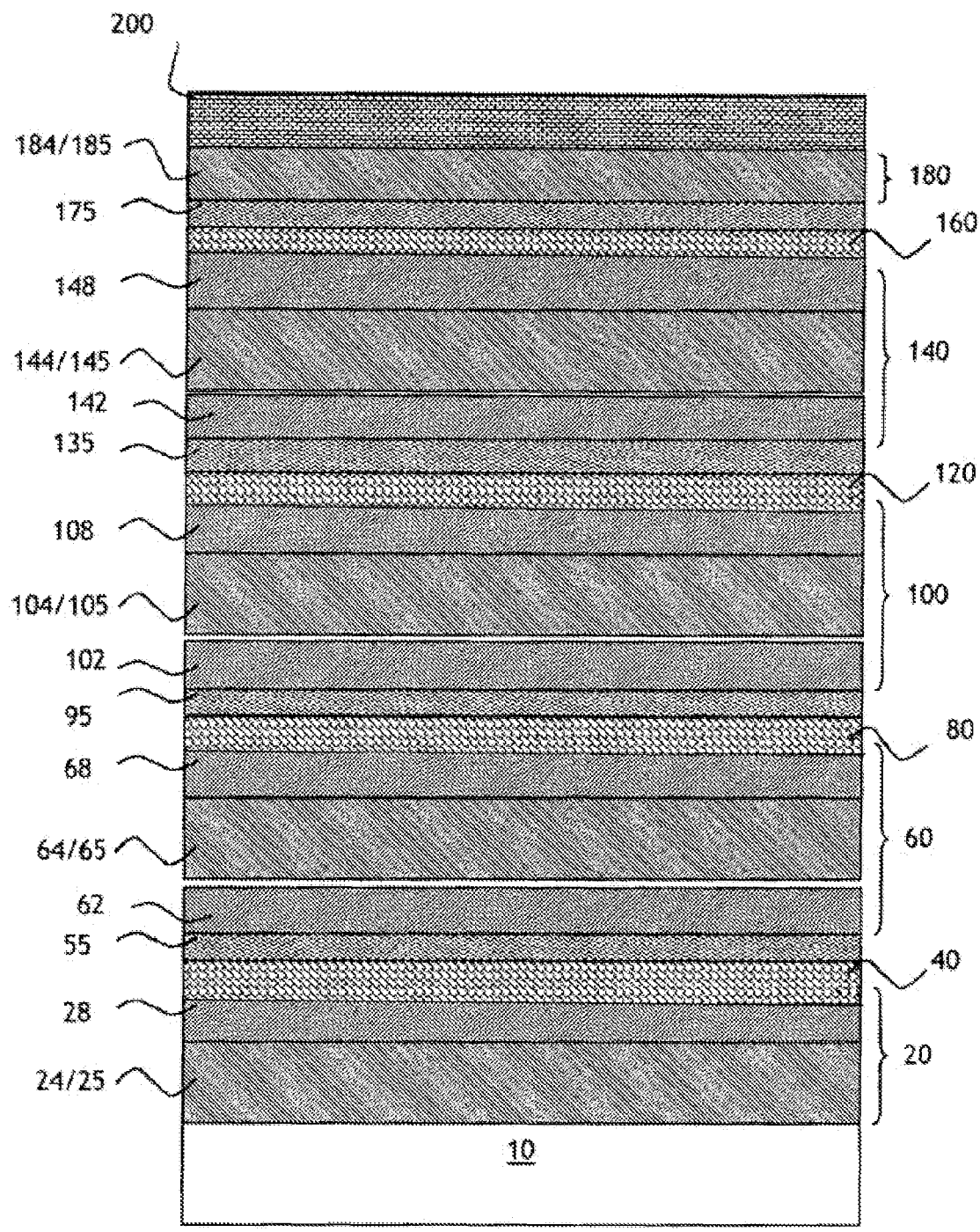
FIG. 2 describes a multilayer comprising four functional films according to the invention, each functional film being provided with an underblocker layer but not being provided with an overblocker layer and the multilayer furthermore being provided with an optional protective coating.

Details and advantageous features of the invention will become clear from the following nonlimiting examples, illustrated using the appended figures showing:

FIG. 1, a multilayer comprising three functional films according to the invention, each functional film not being provided with an underblocker layer but being provided with an overblocker layer and the multilayer furthermore being provided with an optional protective coating; and FIG. 2, a multilayer comprising four functional films according to the invention, each functional film being provided with an underblocker layer but not being provided with an overblocker layer and the multilayer furthermore being provided with an optional protective coating.

In FIGS. 1 and 2, the thicknesses of the various layers are not shown to scale for the sake of legibility.

FIG. 1 illustrates a multilayer structure comprising three functional films 40, 80, 120, this structure being deposited on a transparent glass substrate 10.

Each functional film 40, 80, 120, is located between two antireflection coatings 20, 60, 100, 140, such that the first, starting from the substrate, functional film 40 is located between the antireflection coatings 20, 60; the second functional film 80 is located between the antireflection coatings 60, 100; and the third functional film 120 is located between the antireflection coatings 100, 140.

These antireflection coatings 20, 60, 100, 140, each comprise at least one antireflection film 25/24, 28; 62, 65/64, 68; 102, 105/104,108; 145/144.

Optionally, each functional film 40, 80, 120 may, on the one hand, be deposited on an underblocker layer (not shown) located between the subjacent antireflection coating and the functional film, or each functional film may, on the other hand, be deposited directly under an overblocker layer 55, 95, 135 located between the functional film and the antireflection coating superjacent this film.

FIG. 1 shows a multilayer terminating in an optional protective film 200 that is not present in the examples below. In general, this protective film is very thin and is not taken into consideration when defining the optical properties of the last antireflection coating of the multilayer.

In all of the examples below, the thin-film multilayer is deposited on a clear soda-lime glass substrate 1.6 mm in thickness, marketed by Saint-Gobain.

In each of the examples below, the depositions conditions of the films, which were deposited by sputtering (magnetron sputtering), were the following:

TABLE 1

| Film | Target employed | Deposition pressure | Gas | Refractive index at 550 nm |
|---|---|---|---|---|
| SiAlN | Si:Al at 92:8 wt % | $3.2 \times 10^{-3}$ mbar | Ar/(Ar + $N_2$) at 55% | 2.03 |
| SiZrN | Si:Zr:Al at 58.5:36.5:5 wt % | $2.2 \times 10^{-3}$ mbar | Ar/(Ar + $N_2$) at 56% | 2.24 |
| ZnO | Zn:Al at 98:2 wt % | $1.8 \times 10^{-3}$ mbar | Ar/(Ar + $O_2$) at 63% | 1.95 |
| NiCr | NiCr at 80:20 wt % | $2.5 \times 10^{-3}$ mbar | Ar at 100% | |
| Ag | Ag | $3 \times 10^{-3}$ mbar | Ar at 100% | |

A first set of four examples was produced; these examples are numbered 1 to 4 below. All four were incorporated in a laminated glazing structure: glass substrate 1.6 mm in thickness bearing the multilayer/PVB lamination interlayer 0.76 mm in thickness/glass substrate 1.6 mm in thickness.

Table 2 below collates the materials and thicknesses in nanometers of each layer and the composition of the layers that form the multilayer in their positional order relative to the multilayer-bearing substrate (last line at the bottom of the table); the numbers in the 1st and 2nd columns correspond to the references in FIG. 1.

TABLE 2

|     |     |       | Ex. 1 | Ex. 2 | Ex. 3 | Ex. 4 |
| --- | --- | ----- | ----- | ----- | ----- | ----- |
|     |     | Glass |       |       |       |       |
|     |     | PVB   |       |       |       |       |
| 140 | 145 | SiZrN |       | 30    |       | 30    |
|     | 144 | SiAlN | 35    |       | 35    |       |
| 135 |     | NiCr  | 1     | 1     | 1     | 1     |
| 120 |     | Ag3   | 13    | 13    | 13    | 13    |
| 100 | 108 | ZnO   | 7     | 7     | 7     | 7     |
|     | 105 | SiZrN |       | 58    | 58    |       |
|     | 104 | SiAlN | 63    |       |       | 63    |
|     | 102 | ZnO   | 7     | 7     | 7     | 7     |
| 95  |     | NiCr  | 1     | 1     | 1     | 1     |
| 80  |     | Ag2   | 13    | 13    | 13    | 13    |
| 60  | 68  | ZnO   | 7     | 7     | 7     | 7     |
|     | 65  | SiZrN |       | 58    | 58    |       |
|     | 64  | SiAlN | 63    |       |       | 63    |
|     | 62  | ZnO   | 7     | 7     | 7     | 7     |
| 55  |     | NiCr  | 1     | 1     | 1     | 1     |
| 40  |     | Ag1   | 13    | 13    | 13    | 13    |
| 20  | 28  | ZnO   | 7     | 7     | 7     | 7     |
|     | 25  | SiZrN |       | 30    |       | 30    |
|     | 24  | SiAlN | 35    |       | 35    |       |
|     | 10  | Glass |       |       |       |       |

Each antireflection coating 20, 60, 100 subjacent a functional film 40, 80, 120 comprises a last wetting film 28, 68, 108 based on crystalline aluminum-doped zinc oxide and which makes contact with the functional film 40, 80, 120 deposited just above.

Each antireflection coating 20, 60, 100, 140 comprises:

either a medium-refractive-index antireflection film 24, 64, 104, 144 based on aluminum-doped silicon nitride, here called SiAlN for the sake of simplicity although the true nature of the film is in fact $Si_3N_4$:Al, as explained above;

or a high-refractive-index antireflection coating 25, 65, 105, 145 based on zirconium-doped silicon nitride, here called SiZrN for the sake of simplicity although the true nature of the film is in fact $Si_3N_4$:Zr, as explained above.

These films are important for obtaining the oxygen barrier effect during heat treatment.

In addition, these four examples have the advantage that they can be tempered and bent.

The total thickness of the functional films and the distribution in the thickness of the functional films is the same in these four examples: the multilayers therefore have the same sheet resistance; however, they do not have the same light transmission, light reflection or color in reflection.

Table 3 collates, for examples 1 to 4, the sheet resistance measured, after a heat treatment (bending at 640° C.), for each substrate bearing the multilayer and the main optical properties measured for the complete laminated glazing unit incorporating the substrate bearing the multilayer.

TABLE 3

|                     |            | Ex. 1 | Ex. 2 | Ex. 3 | Ex. 4 |
| ------------------- | ---------- | ----- | ----- | ----- | ----- |
| $T_L$               | %          | 72.43 | 73.62 | 72.65 | 73.42 |
| $R_L$               | %          | 11.04 | 9.87  | 10.91 | 9.97  |
| $R_\square$         | Ω/□        | 1.00  | 1.00  | 1.00  | 1.00  |
| Color in reflection | $a_{R0}*$  | −2.0  | −1.4  | −2.7  | −1.9  |
|                     | $b_{R0}*$  | −1.9  | −2.2  | −2.1  | −1.0  |
| Color in reflection | $a_{R60}*$ | −6.3  | −5.3  | −6.6  | −5.0  |
|                     | $b_{R60}*$ | 1.25  | 0.8   | 1.1   | 0.8   |

For these substrates, $T_L$ represents the light transmission in the visible in %, measured under illuminant A with a 10° observer;

$R_L$ represents the light reflection in the visible in %, measured under illuminant A with a 10° observer;

$R_\square$ represents the sheet resistance in Ω/□ after a heat treatment (bending);

$a_{R0}*$ and $b_{R0}*$ represent the Lab coordinates a* and b* of the color in reflection measured under D65 illuminant with a 10° observer, and thus measured substantially normal to the glazing unit; and $a_{R60}*$ and $b_{R60}*$ represent the Lab coordinates a* and b* of the color in reflection measured under D65 illuminant with a 10° observer at an angle of 60° to the normal to the glazing unit.

It will thus be observed, on comparing example 2 to example 1, that using antireflection barrier films 25, 65, 105, 145 made of SiZrN instead of making each antireflection barrier film 24, 64, 104, 144 from SiAlN allows the light transmission of the glazing unit to be increased by more than 1% while the light reflection remains substantially the same and the color in reflection at 0° and at 60° remains acceptable.

However, example 2 is difficult to implement on an industrial production line because the central antireflection barrier films 65, 105 made of SiZrN, i.e. those flanked by two functional films, are thick (58 nm).

Comparing example 3 to examples 1 and 2 shows that using only central antireflection barrier films 65, 105 made of SiZrN instead of making each central antireflection barrier film 64, 104 from SiAlN while making the first and last antireflection barrier films 24, 144 from SiAlN does not allow the light transmission of the glazing unit to be significantly increased (only by about +0.2%).

The SiAlN and SiZrN films all have an extinction coefficient k below 0.01: the coefficient k of SiAlN at 550 nm is about $1.3 \times 10^{-5}$ and the coefficient k of SiZrN at 550 nm is about $7.5 \times 10^{-5}$.

Comparing example 4 to examples 1 to 3 shows that using only first and last high-refractive-index antireflection barrier films 25, 145 made of SiZrN instead of first and last medium-refractive-index antireflection barrier films 24, 144 made of SiAlN while making each central medium-refractive-index antireflection barrier film 64, 104 of SiAlN allows, as in example 2, the light transmission of the glazing unit to be significantly increased (by about +1%); however, this example is simpler and easier to implement than example 2, and it is furthermore less costly.

In this set of examples, 1 to 4, only example 4 is an example according to the invention because the antireflection coating 20 located under the first, starting from the substrate, functional film 40, and the antireflection coating 140 located on the last, starting from the substrate, functional film 120 each comprise at least one high-refractive-index antireflection film 25, 145 and each antireflection coating 60, 100 located between two functional films does not comprise a high-refractive-index antireflection film.

Example 1 is not an example according to the invention because none of the antireflection coatings 20, 60, 100, 140 comprises a high-refractive-index antireflection film.

Example 2 is not an example according to the invention because all the antireflection coatings 20, 60, 100, 140 comprise a high-refractive-index antireflection film.

Example 3 is also not an example according to the invention because neither the antireflection coating 20 located under the first, starting from the substrate, functional film 40 nor the antireflection coating 140 located on the last, starting from the substrate, functional film 120 comprises at least one high-refractive-index antireflection film and each antireflection coating 60, 100 located between two functional films comprises a high-refractive-index antireflection film 65, 105.

In this first set of examples, 1 to 4, the thicknesses of the three silver films of each example were identical and all 13 nm.

A second set of four examples was produced using the same deposition conditions as for the first set (table 1); these examples are numbered 5 to 8 below. All four were incorporated in a laminated glazing structure: glass substrate 1.6 mm in thickness bearing the multilayer/PVB lamination interlayer 0.76 mm in thickness/glass substrate 1.6 mm in thickness.

In this second set, the total thickness of the functional films was identical from one example to another and was identical to the total thickness of the functional films in the first set of examples; however, unlike the first set of examples, the three functional films were not all the same thickness: the functional film closest the substrate (Ag1) was thicker than the following film (Ag2) which was itself thicker than the following film (Ag3). In the set of examples 5 to 8 there is therefore a decreasing, starting from the substrate, distribution of the thicknesses of the functional films, thereby following the teaching of the international patent application filed under number PCT/FR2010/051732 and published under the number WO 2011/020974.

Table 4 below collates the materials and thicknesses in nanometers of each layer and the composition of the layers that form the multilayer in their positional order relative to the multilayer-bearing substrate (last line at the bottom of the table) for examples 5 to 8; the numbers in the 1st and 2nd columns correspond to the references in FIG. 1.

TABLE 4

| | | | Ex. 5 | Ex. 6 | Ex. 7 | Ex. 8 |
|---|---|---|---|---|---|---|
| | | Glass | | | | |
| | | PVB | | | | |
| 140 | 145 | SiZrN | | 30 | | 30 |
| | 144 | SiN | 35 | | 35 | |
| 135 | | NiCr | 1 | 1 | 1 | 1 |
| 120 | | Ag3 | 11 | 11 | 11 | 11 |
| 100 | 108 | ZnO | 7 | 7 | 7 | 7 |
| | 105 | SiZrN | | 58 | 58 | |
| | 104 | SiN | 63 | | | 63 |
| | 102 | ZnO | 7 | 7 | 7 | 7 |
| 95 | | NiCr | 1 | 1 | 1 | 1 |
| 80 | | Ag2 | 13 | 13 | 13 | 13 |
| 60 | 68 | ZnO | 7 | 7 | 7 | 7 |
| | 65 | SiZrN | | 58 | 58 | |
| | 64 | SiN | 63 | | | 63 |
| | 62 | ZnO | 7 | 7 | 7 | 7 |
| 55 | | NiCr | 1 | 1 | 1 | 1 |
| 40 | | Ag1 | 15 | 15 | 15 | 15 |

TABLE 4-continued

| | | | Ex. 5 | Ex. 6 | Ex. 7 | Ex. 8 |
|---|---|---|---|---|---|---|
| 20 | 28 | ZnO | 7 | 7 | 7 | 7 |
| | 25 | SiZrN | | 30 | | 30 |
| | 24 | SiN | 35 | | 35 | |
| 10 | | Glass | | | | |

The thickness $e_x$ of each functional film 80, 120 is smaller than the thickness of the preceding functional film, in the direction of the substrate 10, and is such that: $e_x = \alpha e_{x-1}$, where:

x is the row, starting from the substrate 10, of the functional film;

x−1 is the row, in the direction of the substrate 10, of the preceding functional film;

α is a number such that $0.5 \leq \alpha < 1$, and preferably $0.55 \leq \alpha \leq 0.95$, or $0.6 \leq \alpha \leq 0.95$; and the thickness of the first, starting from the substrate, metallic functional film 40 is such that $10 \leq e_1 \leq 18$ in nm and preferably $11 \leq e_1 \leq 15$ in nm.

The thickness $e_2$ of the second functional film 80 is $e_2 = 0.87 e_1$, where α thus=0.87; and the thickness $e_3$ of the third functional film 120 is $e_3 = 0.85 e_2$ where α thus=0.85. The value of a is different (by 0.02) for all the functional films of row 2 or more of the multilayer.

Table 5 collates, for examples 5 to 8, the sheet resistance measured, after a heat treatment (bending at 640° C.), for each substrate bearing the multilayer and the main optical properties measured for the complete laminated glazing unit incorporating the substrate bearing the multilayer, all these measurements being carried out in the same way as for examples 1 to 4.

TABLE 5

| | | Ex. 5 | Ex. 6 | Ex. 7 | Ex. 8 |
|---|---|---|---|---|---|
| $T_L$ | % | 71.86 | 72.99 | 72.03 | 72.84 |
| $R_L$ | % | 11.06 | 10.04 | 11.01 | 10.06 |
| $R_\square$ | Ω/□ | 1.00 | 1.00 | 1.00 | 1.00 |
| Color in reflection | $a_{R0}^*$ | 0.1 | 1.1 | −0.2 | −1.1 |
| | $b_{R0}^*$ | −3.5 | −3.1 | −3.3 | −3.2 |
| Color in reflection | $a_{R60}^*$ | −4.8 | −3.8 | −5.3 | −3.5 |
| | $b_{R60}^*$ | 1.4 | 1.1 | 1.5 | 1.0 |

It will thus be observed, in this second set of examples, on comparing example 6 to example 5, that using antireflection barrier films 25, 65, 105, 145 made of SiZrN instead of making each antireflection barrier film 24, 64, 104, 144 from SiAlN allows the light transmission of the glazing unit to be increased by more than 1% while the light reflection remains substantially the same and the color in reflection at 0° and at 60° remains acceptable.

However, example 6 is difficult to implement on an industrial production line because the central antireflection barrier films 65, 105 made of SiZrN, i.e. those flanked by two functional films, are thick (58 nm).

Comparing example 7 to examples 5 and 6 shows that using only central antireflection barrier films 65, 105 made of SiZrN instead of making each central antireflection barrier film 64, 104 from SiAlN while making the first and last antireflection barrier films 24, 144 from SiAlN does not allow the light transmission of the glazing unit to be significantly increased (only by about +0.2%).

Comparing example 8 to examples 5 to 7 shows that using only first and last antireflection barrier films 25, 145 made of SiZrN instead of first and last antireflection barrier films 24, 144 made of SiAlN while making each central antireflection barrier film 64, 104 of SiAlN allows, as in example 6, the light transmission of the glazing unit to be significantly increased (by about +1%); however, this example is simpler and easier to implement than example 6, and it is furthermore less costly.

In this set of examples, 5 to 8, only example 8 is an example according to the invention because the antireflection coating 20 located under the first, starting from the substrate, functional film 40, and the antireflection coating 140 located on the last, starting from the substrate, functional film 120 each comprise at least one high-refractive-index antireflection film 25, 145 and each antireflection coating 60, 100 located between two functional films does not comprise a high-refractive-index antireflection film.

Example 5 is not an example according to the invention because none of the antireflection coatings 20, 60, 100, 140 comprises a high-refractive-index anti reflection film.

Example 6 is not an example according to the invention because all the antireflection coatings 20, 60, 100, 140 comprise a high-refractive-index anti reflection film.

Example 7 is also not an example according to the invention because neither the antireflection coating 20 located under the first, starting from the substrate, functional film 40 nor the antireflection coating 140 located on the last, starting from the substrate, functional film 120 comprises at least one high-refractive-index antireflection film and each antireflection coating 60, 100 located between two functional films comprises a high-refractive-index antireflection film 65, 105.

Because of the large total thickness of the silver films (and therefore the low sheet resistance obtained) and the good optical properties (in particular the light transmission in the visible), it is moreover possible to use the substrate coated with the multilayer according to the invention to produce a transparent electrode substrate.

This transparent electrode substrate may be suitable for an organic light-emitting device, in particular if part of the silicon zirconium nitride antireflection film 145 of example 4 is replaced with a conductive film (in particular having a resistivity lower than $1 \times 10^5$ $\Omega \cdot cm$) and especially with an oxide-based film. This film may for example be made of tin oxide or based on zinc oxide, optionally doped with Al or Ga, or based on a mixed oxide and especially indium tin oxide (ITO), indium zinc oxide (IZO) or optionally-doped (for example with Sb and/or F) tin zinc oxide (SnZnO). This organic light-emitting device may be used to produce a lighting device or a display device (screen).

FIG. 2 illustrates a multilayer structure comprising four functional films 40, 80, 120, 160, this structure being deposited on a transparent glass substrate 10.

Each functional film 40, 80, 120, 160, is located between two antireflection coatings 20, 60, 100, 140, 180, such that the first, starting from the substrate, functional film 40 is located between the antireflection coatings 20, 60; the second functional film 80 is located between the antireflection coatings 60, 100; the third functional film 120 is located between the antireflection coatings 100, 140; and the fourth functional film 160 is located between the antireflection coatings 140, 180.

These antireflection coatings 20, 60, 100, 140, 180, each comprise at least one antireflection film 25/24, 28; 62, 65/64, 68; 102, 105/104, 108; 145/144, 148; 184/185.

Optionally, each functional film 40, 80, 120, 160, may, on the one hand, be deposited on an underblocker layer 35, 75, 115, 155, located between the subjacent antireflection coating and the functional film, or each functional film may, on the other hand, be deposited directly under an overblocker layer (not shown) located between the functional film and the superjacent antireflection coating.

FIG. 2 shows a multilayer terminating in an optional protective film 200, in particular an oxide-based film, especially an oxygen-substoichiometric film.

Each antireflection coating 20, 60, 100, 140 subjacent a functional film 40, 80, 120, 160 comprises a last wetting antireflection film 28, 68, 108, 148 based on crystalline aluminum-doped zinc oxide and which respectively makes contact with the functional film 40, 80, 120, 160 deposited just above.

Each antireflection coating 20, 60, 100, 140, 180 comprises:
either a medium-refractive-index antireflection film 24, 64, 104, 144, 184 based on aluminum-doped silicon nitride, here called SiAlN for the sake of simplicity although the true nature of the film is in fact $Si_3N_4$:Al, as explained above;
or a high-refractive-index antireflection coating 25, 65, 105, 145, 185 based on zirconium-doped silicon nitride, here called SiZrN for the sake of simplicity although the true nature of the film is in fact $Si_3N_4$:Zr, as explained above.

These films are important for obtaining the oxygen barrier effect during heat treatment.

A third set of four examples was produced using the same deposition conditions as for the first set and the second set (table 1); these examples are numbered 9 to 12 below. All four were incorporated in a laminated glazing structure: glass substrate 1.6 mm in thickness bearing the multilayer/PVB lamination interlayer 0.76 mm in thickness/glass substrate 1.6 mm in thickness.

In this second set, the total thickness of the functional films was identical from one example to another and the four functional films were all the same thickness.

Table 6 below collates the materials and thicknesses in nanometers of each layer and the composition of the layers that form the multilayer in their positional order relative to the multilayer-bearing substrate (last line at the bottom of the table) for examples 9 to 12; the numbers in the 1st and 2nd columns correspond to the references in FIG. 2.

TABLE 6

|     |     |       | Ex. 9 | Ex. 10 | Ex. 11 | Ex. 12 |
|-----|-----|-------|-------|--------|--------|--------|
|     |     | Glass |       |        |        |        |
|     |     | PVB   |       |        |        |        |
| 180 | 185 | SiZrN |       | 30     |        | 30     |
|     | 184 | SiN   | 35    |        | 35     |        |
| 175 |     | NiCr  | 1     | 1      | 1      | 1      |
| 160 |     | Ag4   | 11.5  | 11.5   | 11.5   | 11.5   |
| 140 | 148 | ZnO   | 7     | 7      | 7      | 7      |
|     | 145 | SiZrN |       | 58     | 58     |        |
|     | 144 | SiN   | 63    |        |        | 63     |
|     | 142 | ZnO   | 7     | 7      | 7      | 7      |
| 135 |     | NiCr  | 1     | 1      | 1      | 1      |
| 120 |     | Ag3   | 11.5  | 11.5   | 11.5   | 11.5   |
| 100 | 108 | ZnO   | 7     | 7      | 7      | 7      |
|     | 105 | SiZrN |       | 58     | 58     |        |
|     | 104 | SiN   | 63    |        |        | 63     |
|     | 102 | ZnO   | 7     | 7      | 7      | 7      |
| 95  |     | NiCr  | 1     | 1      | 1      | 1      |
| 80  |     | Ag2   | 11.5  | 11.5   | 11.5   | 11.5   |
| 60  | 68  | ZnO   | 7     | 7      | 7      | 7      |
|     | 65  | SiZrN |       | 58     | 58     |        |
|     | 64  | SiN   | 63    |        |        | 63     |
|     | 62  | ZnO   | 7     | 7      | 7      | 7      |
| 55  |     | NiCr  | 1     | 1      | 1      | 1      |
| 40  |     | Ag1   | 11.5  | 11.5   | 11.5   | 11.5   |

TABLE 6-continued

|    |    |       | Ex. 9 | Ex. 10 | Ex. 11 | Ex. 12 |
|----|----|-------|-------|--------|--------|--------|
| 20 | 28 | ZnO   | 7     | 7      | 7      | 7      |
|    | 25 | SiZrN |       | 30     |        | 30     |
|    | 24 | SiN   | 35    |        | 35     |        |
|    | 10 | Glass |       |        |        |        |

Table 7 collates, for examples 9 to 12, the sheet resistance measured, after a heat treatment (bending at 640° C.), for each substrate bearing the multilayer and the main optical properties measured for the complete laminated glazing unit incorporating the substrate bearing the multilayer, all these measurements being carried out in the same way as for examples 1 to 8.

TABLE 7

|             |              | Ex. 9 | Ex. 10 | Ex. 11 | Ex. 12 |
|-------------|--------------|-------|--------|--------|--------|
| $T_L$       | %            | 72.05 | 72.82  | 72.24  | 72.61  |
| $R_L$       | %            | 9.02  | 8.43   | 9.02   | 8.44   |
| $R_\square$ | $\Omega/\square$ | 0.85 | 0.85  | 0.85   | 0.85   |
| Color in reflection | $a_{R0}^*$ | 6.1 | 5.4 | 6.1 | 5.6 |
|             | $b_{R0}^*$   | -4.4  | -3.9   | -4.9   | -3.7   |
| Color in reflection | $a_{R60}^*$ | 5.8 | 4.9 | 5.8 | 5.0 |
|             | $b_{R60}^*$  | -3.0  | -2.7   | -3.6   | -2.3   |

It will thus be observed, in this third set of examples, on comparing example 10 to example 9, that using antireflection barrier films 25, 65, 105, 145, 185 made of SiZrN instead of making each antireflection barrier film 24, 64, 104, 144, 184 from SiAlN allows the light transmission of the glazing unit to be increased by almost 1% while the light reflection remains substantially the same and the color in reflection at 0° and at 60° remains acceptable.

However, example 10 is difficult to implement on an industrial production line because the central antireflection barrier films 65, 105, 145 made of SiZrN, i.e. those flanked by two functional films, are thick (58 nm).

Comparing example 11 to examples 9 and 10 shows that using only central antireflection barrier films 65, 105, 145 made of SiZrN instead of making each central antireflection barrier film 64, 104, 144 from SiAlN while making the first and last antireflection barrier films 24, 184 from SiAlN does not allow the light transmission of the glazing unit to be significantly increased (only by about +0.2%).

Comparing example 12 to examples 9 to 11 shows that using only first and last antireflection barrier films 25, 185 made of SiZrN instead of first and last antireflection barrier films 24, 184 made of SiAlN while making each central antireflection barrier film 64, 104, 144 of SiAlN allows, as in example 10, the light transmission of the glazing unit to be significantly increased; however, this example 12 is simpler and easier to implement than example 10, and it is furthermore less costly.

In this set of examples, 9 to 12, only example 12 is an example according to the invention because the antireflection coating 20 located under the first, starting from the substrate, functional film 40, and the antireflection coating 180 located on the last, starting from the substrate, functional film 160 each comprise at least one high-refractive-index antireflection film 25, 185 and each antireflection coating 60, 100, 140 located between two functional films does not comprise a high-refractive-index antireflection film.

Example 9 is not an example according to the invention because none of the antireflection coatings 20, 60, 100, 140, 180 comprises a high-refractive-index antireflection film. Example 10 is not an example according to the invention because all of the antireflection coatings 20, 60, 100, 140, 180 comprise a high-refractive-index antireflection film. Example 11 is also not an example according to the invention because neither the antireflection coating 20 located under the first, starting from the substrate, functional film 40 nor the antireflection coating 180 located on the last, starting from the substrate, functional film 160 comprises at least one high-refractive-index antireflection film and each antireflection coating 60, 100, 140 located between two functional films comprises a high-refractive-index antireflection film 65, 105, 145.

Generally, the transparent electrode substrate may be suitable for use as a heated substrate for a heated glazing unit and in particular a laminated heated windshield. It may also be suitable for use as a transparent electrode substrate for any electrochromic glazing unit, any display screen or even for use in a photovoltaic cell especially as a frontside or backside substrate for a transparent photovoltaic cell.

The present invention has been described above by way of example. Of course, a person skilled in the art will be able to produce various alternative forms of the invention without departing from the scope of the patent defined by the claims.

The invention claimed is:

1. A coated substrate comprising a substrate coated with a thin-film multilayer comprising, in alternation, "n" metallic functional films, and "(n+1)" antireflection coatings where n is an integer≥3, each antireflection coating comprising at least one antireflection film, such that each functional film is located between two antireflection coatings;
    wherein the thin-film multilayer comprises at least two high-refractive-index antireflection film, each having a refractive index ≥2.15, such that the antireflection coating located under the first, starting from the substrate, functional film and the antireflection coating located on the last, starting from the substrate, functional film each comprise at least one high-refractive-index antireflection film and each antireflection coating located between two functional films does not comprise a high-refractive-index film having a refractive index ≥2.15; and
    wherein the thickness $e_x$ of each of a second functional film, and a third functional film starting from the substrate, is smaller than the thickness of the preceding functional film, in the direction of the substrate, and is such that:

$e_x = \alpha e_{x-1}$, wherein:
    x is the position, starting from the substrate, of one of the second and third functional film with respect to the functional films;
    x−1 is the position, in the direction of the substrate, of one of the preceding functional films;
    α satisfies 0.5≤α<1; and
    the thickness of the first metallic functional film $e_1$, starting from the substrate is such that 10 nm≤$e_1$≤18 nm;
    wherein said substrate is suitable for incorporation into a thermal insulation, a heated glazing, a solar protection glazing, display, photovoltaic panel or other electronic device, or
    wherein said substrate is suitable for coating with one or more functional films that act on solar radiation and/or infrared radiation.

2. The coated substrate of claim 1, wherein the antireflection coating located under the first, starting from the substrate, functional film consists, in this order, starting from the substrate, of: one or more high-refractive-index antireflection films and then a medium-refractive-index wetting antireflection film having a refractive index of between 1.60 and 2.15, excluding these values, and comprising a crystalline oxide, optionally doped with at least one other element.

3. The coated substrate of claim 1, wherein the antireflection coating located on the last, starting from the substrate, functional film consists essentially of one or more high-refractive-index antireflection films.

4. The coated substrate of claim 1, wherein at least one high-refractive-index antireflection film comprises silicon zirconium nitride.

5. The coated substrate of claim 1, wherein the value of a differs by at least 0.02 for all functional films of layer 2 or more of the multilayer to which the formula $e_x = \alpha e_{x-1}$ is applied.

6. The coated substrate of claim 1, wherein the value of a is different for all the functional films of layer 2 or more.

7. The coated substrate of claim 1, wherein the total thickness of the metallic functional films is greater than 30 nm, or this total thickness lies between 35 and 50 nm for a thin-film multilayer comprising three functional films, or this total thickness lies between 40 and 60 nm for a thin-film multilayer comprising four functional films.

8. The coated substrate of claim 1, wherein each of the antireflection coatings located between two functional films that do not comprise a high-refractive-index antireflection film comprise at least one antireflection film comprising silicon nitride, optionally doped with at least one other element.

9. The coated substrate of claim 1, wherein the last film of each antireflection coating subjacent a functional film is a wetting antireflection film comprising a crystalline oxide, optionally doped with at least one other element.

10. A glazing unit, comprising the coated substrate of claim 1, optionally associated with at least one other substrate, wherein the substrate bearing the thin-film multilayer is optionally bent or tempered, or both bent and tempered.

11. A heated transparent coating, a transparent electrode, a lighting device, a display device, or a photovoltaic panel comprising the coated substrate of claim 1.

12. The coated substrate of claim 1, wherein the metallic functional films comprise silver or a metal alloy comprising silver.

13. The coated substrate of claim 2, wherein the crystalline oxide is zinc oxide optionally doped with aluminum.

14. The coated substrate of claim 1, wherein $\alpha$ satisfies $0.55 \leq \alpha \leq 0.95$.

15. The coated substrate of claim 1, wherein $\alpha$ satisfies $0.6 \leq \alpha \leq 0.95$.

16. The coated substrate of claim 7, wherein the total thickness of the metallic thin film is between 30 and 60 nm, including these values.

17. The coated substrate of claim 8, wherein the silicon nitride is doped with aluminum.

18. The coated substrate of claim 9, wherein the crystalline oxide is zinc oxide, optionally doped with aluminum.

19. The glazing unit of claim 10, which is a multiple glazing unit.

20. A laminated glazing unit comprising:
    the coated substrate of claim 1 which is optionally bent or tempered;
    an electrical connector configured to heated the laminated glazing unit, and optionally,
    a second substrate.

21. The coated substrate of claim 1 that is made of glass or another rigid mineral material and that is transparent.

22. The coated substrate of claim 1 that is suitable for incorporation into a thermal insulation.

23. The coated substrate of claim 1 that is suitable for incorporation into a glazing.

24. The coated substrate of claim 1 that is suitable for incorporation into a photovoltaic panel.

25. The coated substrate of claim 1 that is suitable for incorporation into a display or other electronic device.

* * * * *